Jan. 19, 1960 G. W. EMMERT 2,921,493
TAPE DISPENSER
Filed Dec. 3, 1956 2 Sheets-Sheet 1
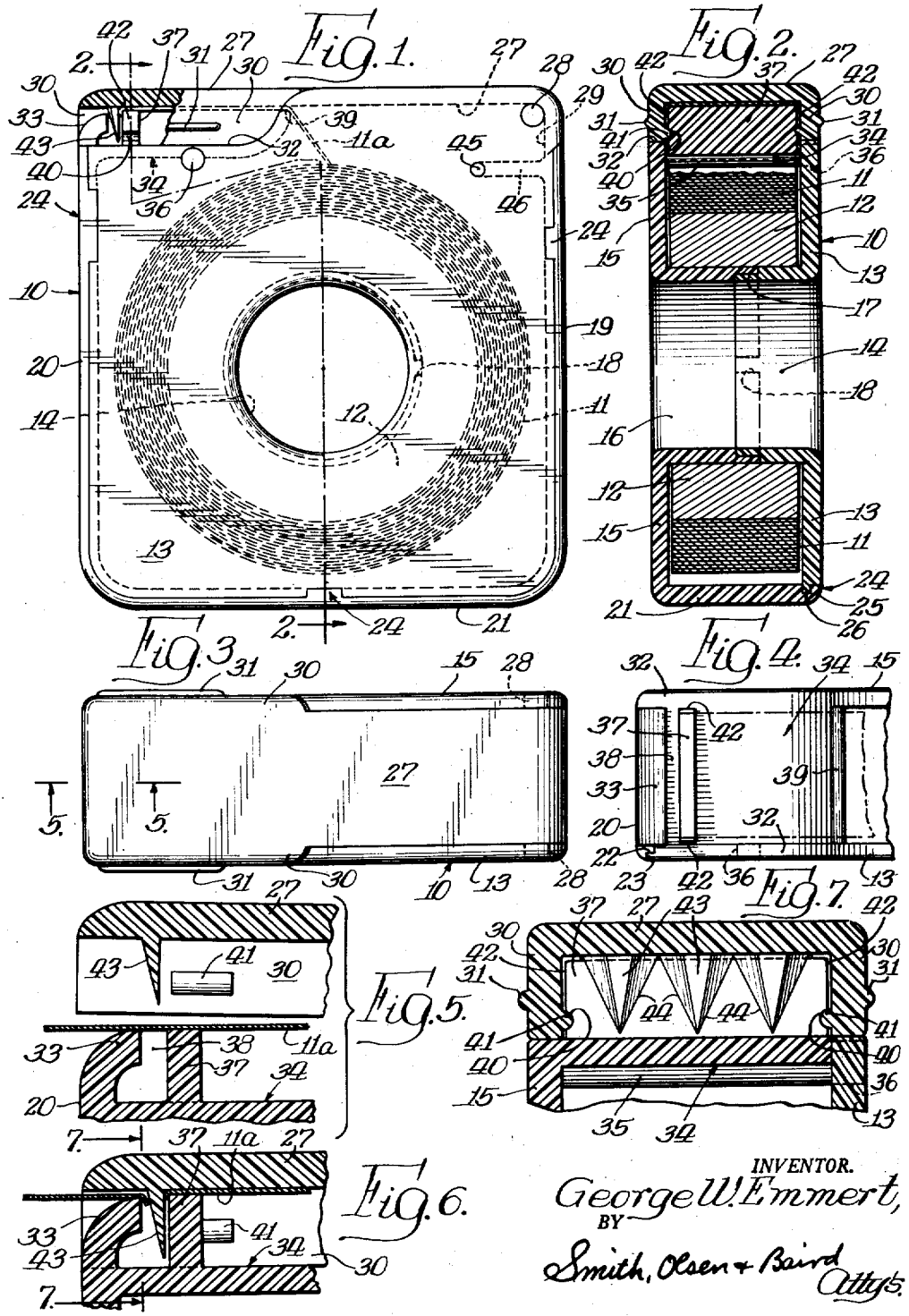
INVENTOR.
George W. Emmert,
BY
Smith, Olsen & Baird
Attys.

Jan. 19, 1960  G. W. EMMERT  2,921,493
TAPE DISPENSER
Filed Dec. 3, 1956  2 Sheets-Sheet 2
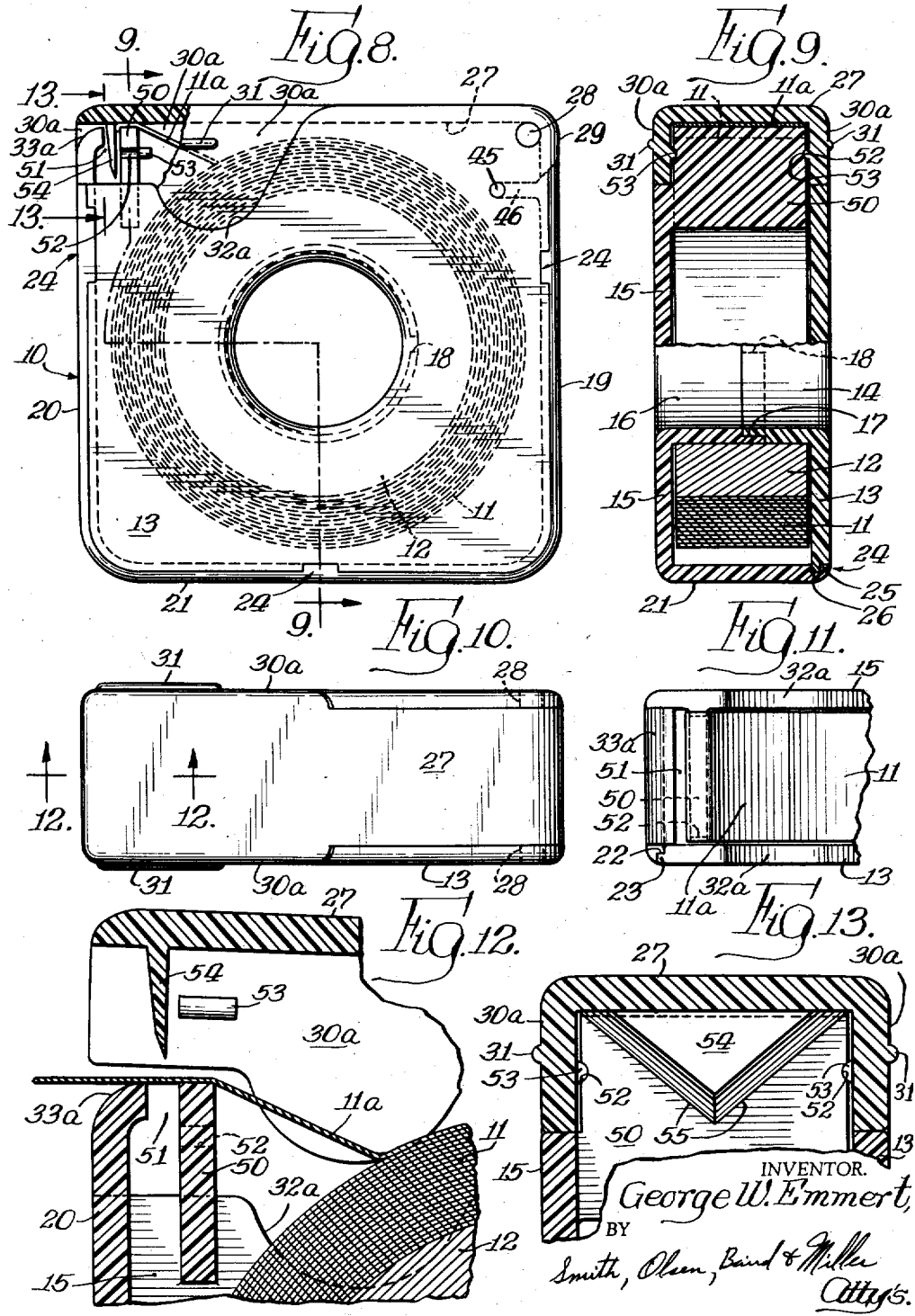
INVENTOR.
George W. Emmert,
BY
Smith, Olsen, Baird & Miller
Attys.

United States Patent Office 2,921,493
Patented Jan. 19, 1960

2,921,493
TAPE DISPENSER

George W. Emmert, Winnetka, Ill., assignor to Federal Tool Corporation, Chicago, Ill., a corporation of Illinois Application December 3, 1956, Serial No. 626,570

17 Claims. (Cl. 83—611)

The present application is a continuation-in-part of my copending application Serial No. 353,170, filed May 5, 1953, now abandoned, and relates to tape dispensers that are especially useful for dispensing and severing tapes of the adhesive type. The apparatus of the present invention is usable with particular advantage, for example, in dispensing and severing adhesive tapes of the elastomeric kind which, because of their tough, elastic qualities, do not readily tear or rip and are difficult to cut or sever by means heretofore available in inexpensive tape dispensers.

A recently developed tape of the general kind just referred to, for example, is fabricated of a vinyl copolymer containing a polymeric type plasticizer which renders the tape tough and very resilient and rubber-like in its qualities. Because it is substantially chemically inert and has a very low moisture absorption rate, the tape is ideally suited for use as a surgical adhesive tape and has already found acceptance in that field. Its acceptance, however, has heretofore been retarded to some extent because of the lack of a simple and inexpensive apparatus for dispensing and severing the tape to desired length. The tape can be cut by closely ground metallic shears and the like, but because of its very low modulus of elasticity it cannot readily be ripped or torn to length, as has been the case with ordinary cloth-backed adhesive tape, and the new tape cannot satisfactorily be severed by inexpensive cutting devices of the kind heretofore known that can economically be embodied in handy manually operated dispensers of the home type.

The present invention makes use of applicant's discovery that elastomeric type tapes such as that just described, as well as tapes of other kinds, can easily be severed along a clean, even line transverse the tape by means making use of the principle that the amount of momentum transferred from a moving body to a stationary body, when the latter is pierced or cut by the former, is an inverse function of the impact velocity or a direct function of the time span during which the piercing or cutting takes place. To this end applicant has discoverd that tapes having low moduli of elasticity can be easily severed along a clean line, in spite of their relatively great elasticity, by a single rapidly executed snapping motion wherein the tape is quickly perforated either at a single point or substantially simultaneously at a plurality of evenly spaced points along the line and thereupon, in the same quick snapping motion, the portions of the tape on either side of the perforations are quickly and simultaneously cut by a severing action having lateral components of movement directed in opposite directions from each of the perforations toward the sides of the tape or toward the next adjacent perforations. In the execution of this cutting scheme the piercing and severing steps take place almost instantaneously. Thus, the tendency to transfer the momentum the piercing and severing medium to the tape is very low. As a result, the tape, even though it may have a very low modulus of elasticity, is perforated and completely severed laterally before it can stretch sufficiently to absorb the force of impact. One of the important advantages of this discovery is that the means employed for cutting the tape may be very simple and relatively inexact in construction, thereby rendering the means easy and inexpensive to manufacture since closely fitting shearing surfaces need not be employed.

In addition to the provision of the tape severing method just referred to, the objects of the present invention include the provision of a sanitary tape dispenser so constructed and arranged that in its operation the foregoing method is practiced in dispensing and severing tape to desired length. A further object of the invention is to provide an inexpensive tape dispenser for enclosing a roll of tape and having quick acting means thereon for perforating a length of the tape at one or a plurality of points along a line transverse thereto and severing the tape laterally in opposite directions from each of the perforations toward the sides of the tape or toward the next adjacent perforations. Still another object of the present invention is to provide a tape dispenser of the character just stated wherein the casing for enclosing the roll of tape is provided with a cover member having thereon means for perforating and severing the tape. A further object of the invention is to provide, in combination with the cover member, means on said casing for supporting the tape in an elevated and accessible position while the tape is perforated and severed by movement of the cover member into its closed position, said supporting means providing elevated surfaces to which one severed end of the tape will adhere in position to be grasped by the fingers when the cover member is again lifted. Yet another object of the invention is to provide in the dispenser means for insuring that the cover member will always be moved in snapping motion into its closed position to perforate and sever the tape cleanly along an even line before it can stretch materially.

These and other objects and advantages of the apparatus of the present invention will be apparent from the following description of two forms of the apparatus, taken with the accompanying drawing wherein:

Fig. 1 is a side elevation of a tape dispenser embodying the present invention, the upper left-hand corner of the dispenser being broken away for clearness of illustration;

Fig. 2 is a sectional view taken substantially along the line 2—2 in Fig. 1;

Fig. 3 is a top plan view of the dispenser which, like Figs. 1 and 2, shows a cover member on the top of the dispenser case in closed position;

Fig. 4 is a fragmentary top view of the upper left-hand portion of the dispenser, as seen in Figs. 1 and 3, with the cover member removed or moved to open position out of range of the fragmentary view;

Fig. 5 is a fragmentary cross-sectional view on an enlarged scale taken along the line 5—5 in Fig. 3, showing the relationship of the cover member to other parts as the cover member is moved from its open position toward its closed position;

Fig. 6 is a similar fragmentary cross-sectional view showing the relative position of the parts when the cover member has been snapped downwardly into its closed position wherein a plurality of teeth on the cover member have first perforated a length of tape at a plurality of points along a line transverse the tape and then have severed the tape laterally between the perforations;

Fig. 7 is another fragmentary cross-sectional view, on substantially the same enlarged scale, taken along the line 7—7 in Fig. 6, showing the cover member in its closed position and showing the incorporation of a stop means for insuring that the cover member will always be snapped into its closed position to perforate and sever the portions of the tape between the perforations;

Fig. 8 is a side elevation of a modified form of the dispenser with a portion of the cover broken away at the upper left-hand corner of the view;

Fig. 9 is a cross-sectional view taken substantially along the line 9—9 in Fig. 8;

Fig. 10 is a top plan view of the dispenser of Fig. 8 showing, like Figs. 8 and 9, the cover of the dispenser in its closed position;

Fig. 11 is a fragmentary top plan view of the upper left-hand portion of the modified dispenser, as seen in Figs. 8 and 10, with the cover moved to open position out of range of the view;

Fig. 12 is an enlarged fragmentary cross-sectional view taken substantially along the line 12—12 in Fig. 10 showing the relationship of the cover of the modified form of the dispenser with respect to the other parts and with respect to the tape that is about to be severed as the cover is moved toward its closed position: and Fig. 13 is an enlarged fragmentary transverse cross-section taken just ahead of the cutting tooth substantially along the line 13—13 of Fig. 8.

In the drawings, the numeral 10 designates, generally, a casing for enclosing a roll 11 of adhesive tape wound in the usual manner about a core 12. The principal part of each of the two casings illustrated is fabricated in two single piece portions which may be molded or otherwise formed of plastic or the like. One of these portions provides a forward side wall 13 for the casing, having either of the peripheral shapes illustrated in Fig. 1 or in Fig. 8, and having formed thereon, at its approximate center, an inwardly extending cylindrical hub element 14. The other principal portion of the casing in each instance provides the back side wall 15 of the casing and has formed thereon, at its approximate center, a similar cylindrical hub element 16 that meets and is engaged by the hub element 14 of the wall 13 in a sliding press fit at an overlap joint 17 (Figs. 2 and 9), the core 12 of the roll of adhesive tape being rotatably supported between the walls 13 and 15 on the outer surfaces of the hub elements 14 and 16, as best illustrated in Figs. 1 and 2 and in Figs. 8 and 9. Superimposed slots 18 may be provided in hub elements 14 and 16 at their overlapping joint 17 in order to increase the resilience of the hub elements in the overlapped areas and thus insure a perfect sliding fit between the two. The walls 13 and 15 in each of the illustrated embodiments have the same general configuration and shape, but the back wall 15 in each instance has forwardly extending vertical end walls 19 and 20 of the casing formed integrally thereon as well as a forwardly extending bottom wall 21. The forward edges of these end walls and the bottom wall are recessed as at 22 (see particularly Figs. 4 and 11) to provide a recessed ledge for receiving a lip 23 formed along the bottom and side edges of the front side wall 13, the front side wall in effect being received between the outer edge portions of the end and bottom walls 19, 20 and 21 with the outermost surface of the wall 13 being flush therewith. This ledge and lip mating between the front wall and the sides and bottom of the casing is interrupted at convenient locations by identical lock joints 24, each of which comprises an inwardly extending overhanging lip 25 formed on the outer edge of the end or bottom wall, as the case may be, which overlays an outwardly extending coacting lip 26 formed on the edge of the front side wall 13, as best seen in Fig. 2 and in Fig. 9. More will be said later concerning the assembly of the casings, but it may be noted now that the lips 25 and 26 of the lock joints 24 are sprung past each other into the locking position shown in Fig. 2 and Fig. 9 during the assembly, thereby retaining the front side wall 13 in place.

The top of the casing in each of the two illustrated embodiments is open and is provided with a generally rectangular-shaped cover member 27 pivotally mounted adjacent one of its ends between the walls 13 and 15 by means of a pin 28 that is located at the upper right-hand corner of the casing and journaled in the front and back side walls 13 and 15. The end of the cover member 27 adjacent the pin 28 is provided with a downwardly extending skirt 29 that is adapted to mate with the adjacent upper end of the end wall 19 of the casing, and at its opposite end the cover member is provided along its side edges with two downwardly turned flanges 30 (Figs. 1 to 7) or 30a (Figs. 8 to 13) which may be grasped between the fingers when the cover is to be raised or lowered. To facilitate this operation, particularly when the cover is to be raised, the outer surfaces of the flanges 30 and 30a may be provided with ribs 31 to cause increased friction with the fingers. As previously stated, the cover member 27 in each case is pivotally mounted between the walls 13 and 15 of the casing, and toward the end of the cover member at which the pin 28 is located these walls extend upwardly to a position flush with the upper surface of the cover member. At the opposite end of the casing, however, the walls 13 and 15 are cut down, as at 32 in Fig. 1 and at 32a in Fig. 8, in pleasing curves to receive the downwardly extending flanges or ears 30 or 30a on the cover member and also to make it easier to grasp the end of the tape 11, as will shortly be explained.

The upper end of the end wall 20 of the casing of Figs. 1 to 6, at the free end of the cover member 27, is curved inwardly, as at 33, and extending inwardly from the base of this curved portion there is a shelf-like saddle-shaped element 34 formed integrally with the wall 20 as well as with the upper edge of the back wall 15 at its cut-down portion 32, and extending generally horizontally across the interior of the casing into contact with the front wall 13 at its cut-down portion. This saddle-shaped element 34 may have a transverse reinforcing rib 35 formed along its underside terminating in a pin 36 that is received in an appropriate opening in the front wall 13 of the casing at the time the casing is assembled, thus giving the saddle element 34 rigidity and strength in spite of the fact that, like all of the other parts of the dispenser, it may be formed of relatively thin and inexpensive plastic.

Spaced inwardly from the inturned upper end 33 of the end wall 20 of the dispenser of Figs. 1 to 7, the shelf-like saddle element 34 has an upstanding transverse block 37 formed integrally thereon, the upper surface of this block being flat and being disposed slightly above the corresponding surface of the inturned end of the wall 20. The space between the block 37 and the inturned end 33 of the wall 20 provides a slot that is designated in Fig. 4 by the numeral 38. The opposite or inner end of the saddle element 34 is curved upwardly to correspond to the curve of the cut-down portions 32 of the front and back walls 13 and 15 of the casing and terminates in a rounded end 39 below the uppermost edges of the front and back walls and substantially on the same level as the flat upper surface of the block 37.

The opposite sides of the block 37 on the saddle element of the dispenser of Figs. 1 to 7 are provided with a pair of horizontal grooves 40 which coact with a pair of inwardly extending ribs 41 formed on the inner surfaces of the downwardly extending flanges 30 on the sides of the cover member 27. The side portions of the block 37 above these grooves overhang the grooves and provide detent or stop surfaces 42 which also coact with the ribs 41 on the flanges of the cover. In this regard the flanges 30 are somewhat resilient and the detent or stop surfaces 42 and the inwardly extending ribs 41 are of such size and are so positioned that the ribs must be snapped over the stop surfaces as the cover member 27 is passed from a partly closed intermediate position (wherein the ribs have only come into contact with the stop surfaces) into its fully closed position wherein the ribs come to rest in the grooves 40 and tend to retain the cover member in closed position. It will thus be seen that, because of the coaction between the ribs 41 and the stop or detent surfaces 42, the cover member 27 of the dispenser of Figs. 1 to 7 must invariably be moved from its intermediate partly closed position into its closed position in a quick snapping motion. This quick snapping motion is utilized in a novel manner to cause the tape to be severed, as will presently be explained.

In the embodiment of the dispenser shown in Figs. 1 to 7, a row of pointed teeth 43 are arranged or formed on the underside of the cover member in side-by-side position between the downwardly extending flanges 30 thereon, the teeth being so positioned that they are received in the slot 38 when the cover member 27 is moved into closed position. These teeth are pointed and are otherwise identical in size and shape, each of the teeth having lateral cutting edges 44 thereon which diagonally converge at the points of the teeth. The teeth may be formed of plastic, and, although their cutting edges 44 are beveled to a relatively fine line, the cutting edges need not be knife-sharp and need not meet with the block 37 or the end of the inturned portion 33 of the wall 20 along the slot 38 in a fine shearing relationship. The teeth are thus inexpensive to form.

It will be observed that the embodiment of the invention illustrated in Figs. 8 to 13 differs from that shown in Figs. 1 to 7 primarily in that the saddle-like member 34 is eliminated, thereby permitting the height of the dispenser casing to be reduced. This permits the dispenser of Figs. 8 to 13 to be manufactured slightly more cheaply than that shown in Figs. 1 to 7 since somewhat less material is used in its construction. Other differences are noted below.

Turning specifically to Figs. 8 to 13, it will be seen that the upper end of the end wall 20 of the casing there shown is curved inwardly as at 33a to provide an upstanding surface immediately below the free end of the cover 27 and spaced radially outwardly with respect to the periphery of the roll of tape. Spaced inwardly from this upstanding surface there is an upstanding transverse block 50 formed integrally upon the back side wall 15, the space between the block and the inturned upstanding surface 33a providing a slot that is designated by the numeral 51. The opposite ends of the block 50 are provided with a pair of horizontal grooves 52 which coact with a pair of inwardly extending ribs 53 formed on the inner surfaces of the downwardly extending flanges 30a on opposite sides of the cover 27, the coaction being similar to that previously described with respect to the grooves 40 and ribs 41 in the embodiment shown in Figs. 1 to 7. Instead of having a row of cutting teeth, the dispenser shown in Figs. 8 to 13 is provided with a single cutting tooth 54 on the underside of the free end of the cover 27, as best seen in Figs. 12 and 13. This tooth is pointed and is provided with converging lateral cutting edges 55 which meet at the point of the tooth, the tooth being so positioned that it is received by the slot 51 when the cover 27 is moved to its closed position, as illustrated. The tooth 54, like the teeth 43, may be formed of plastic and may be integrally formed with the cover 27.

The roll of adhesive tape 11—12 is placed in the casing 10 of both forms of the present dispenser at the time the dispenser is assembled, the core 12 of the roll being rotatably supported on the hub elements 14—16 while the two halves of the dispenser are brought into proper assembled relationship with the cover member mounting pin 28 being received in the appropriate openings in the front and back side walls of the dispenser and the pin 36 on the saddle-shaped element 34, in the case of the embodiment shown in Figs. 1 to 7, being similarly received in an opening in the front wall 13. If desired, a further bracing pin 45 received in appropriate openings in the front and back walls of the casing may be employed, this bracing pin being formed integrally upon a web 46 extending inwardly from the end wall 19 of the casing, as shown in Fig. 1 and in Fig. 8. The teeth 43 or the single tooth 54 and the mounting pin 28 for the cover member 27 may be formed integrally with the cover member, and when this is done it will be noted that the entire dispenser consists of only three individual pieces, the saddle element 34 being integral with the back wall 15 and the end wall 20 in the embodiment shown in Figs. 1 to 7. These three pieces, broadly, are the front side wall 13, the back side wall 15 and the cover member 27, all of the other parts of the dispenser being formed integrally with one or the other of these three parts. It will thus be understood that the present dispenser in both of its forms may be manufactured and assembled rapidly and inexpensively and that it may be sold in its assembled condition containing the roll of tape 11—12.

The first time the dispenser is used the cover member 27 is first lifted to full open position and the end of the roll of tape is grasped in the fingers and pulled outwardly through the open top of the casing. The unrolled length of tape 11a, in the case of the dispenser of Figs. 1 to 7, is pulled across the inner edge 39 of the saddle member 34 and thence across the block 37 thereon, across the slot 38 and on outwardly to the length desired. In the case of the dispenser of Figs. 8 to 13, on the other hand, the withdrawn length of tape 11a is bridged directly across the upstanding block 50 and the surface 33a, as best seen in Fig. 12. The cover member 27 is then moved by the fingers toward its closed position, the cover member and the upper portion of the casing coacting or moving as a pair of jaws. As the cover member approaches and reaches its intermediate position, the ribs 41 or 53 on the cover, as the case may be contact the stop or detent surfaces provided by the opposite ends of the blocks 37 or 54 and the stop surfaces tend to obstruct continued movement of the cover member toward its closed position. Increased pressure on the cover member is required to complete the closing operation and the operator thus presses more firmly on the cover member until the flanges 30 or 30a thereon flex outwardly sufficiently to permit the ribs to snap past the stop surfaces, thereby causing the cover member necessarily to be moved from its intermediate into its fully closed position in a quick snapping motion independent of the speed with which the operator might otherwise normally tend to close the cover.

During this quick snapping movement of the cover member into its fully closed position the tape is perforated, in the case of the embodiment in Figs. 1 to 7, at a plurality of points and the cutting edges 44 of the teeth 43 instantaneously come into play to sever those portions of the tape between the perforations as the teeth are snapped downwardly through the tape and into the slot 38. In the case of the embodiment in Figs. 8 to 13, the single tooth 54 perforates the tape and its cutting edges 55 sever the tape toward its lateral edges. Due to the converging nature of the cutting edges on each tooth it will be seen that movement of the teeth and their cutting surfaces downwardly causes the effective areas of cutting, along the cutting edges, to have lateral components of movement in opposite directions away from each perforation and toward the edges of the tape or toward the next adjacent perforations. This action when carried out in the quick snapping motion insured during the closing of the cover member 27 by the coaction of the stop surfaces and the ribs, severs the tape cleanly and evenly even though the tape may be relatively tough and resilient. Both the perforating and the severing of the tape takes place so quickly, because of the snapping movement of the cover member to closed position, that no appreciable momentum is transferred from the cover member to the tape during the operation. Thus, substantially all of the force of impact is absorbed in severing the tape rather than in stretching the tape.

Having been cut to desired length, the severed portion of the tape is free to be used as the operator may desire, and upon completion of the severing action, as just described, the cover member 27 will be in its fully closed position wherein it completely closes the casing and maintains the roll of tape in a sanitary condition, the cover being retained in its closed position by reason of the presence of the ribs 41 or 53 in the grooves 40 or 52 as perhaps best seen in Fig. 7 and Fig. 13. The end of the tape 11a that remains within the casing is retained in position readily to be grasped whenever the cover member 27 is again opened for the purpose of withdrawing and severing another length of the tape. In this regard it will be noted that the adhesive coating on the underside of the end 11a of the tape causes that portion of the tape to adhere, in the case of the embodiment in Figs. 1 to 7, to the top of the upstanding block 37 on the saddle-shaped element 34 as well as to the opposite upstanding rounded end 39 thereof, thus causing the tape in effect to maintain itself in a relatively taut bridge (Fig. 1) across the saddle element where it may easily be grasped by the fingers. As a consequence, when the operator again wishes to withdraw and sever another length of tape, he need only lift the cover by moving it upwardly past the stop surfaces 42, grasp the end 11a of the tape where it bridges the saddle, and withdraw the length desired, whereupon the perforating and severing action may be repeated in the manner described above. In the case of the embodiment of the invention shown in Figs. 8 to 13, on the other hand, the adhesive coating on the underside of the withdrawn length of tape 11a causes that portion of the tape to adhere to the upper surface of the block 50, thus causing the tape in effect to maintain itself in a relatively taut and easily accessible elevated bridge (Figs. 8 and 12) extending directly from the periphery of the roll to the block 50 where it may be easily grasped by the fingers preparatory to the withdrawal of another length of tape when the cover 27 has again been lifted. During the grasping of the end of the tape in the manner just described, the presence of the downwardly extending flanges 30 or 30a on the cover member 27 protects the tooth 54 and the teeth 43, and the fact that the front side wall 13 and the rear wall 15 of the case are both cut down at 32 or 32a in the area next adjacent the bridged tape, fully exposes that portion of the tape and makes the tape easier to grasp. It will also be observed that the downwardly extending flanges 30 and 30a are received in the recesses 32 and 32a of the walls of the dispenser casing when the cover is closed and thus enclose the sides of the blocks 37 and 50 as well as the tape that is bridged therefrom.

The foregoing description has been given for clearness of understanding only, and no unnecessary limitations should be implied therefrom, for it will be apparent to those skilled in the art that numerous variations and changes may be made in both forms of the present apparatus without departing from the spirit and scope of the appended claims.

I claim:

1. A tape dispenser comprising, a casing for enclosing a roll of tape, means within said casing for rotatably supporting said roll, said casing having a slot thereon and an opening through which said tape may be withdrawn in a path over said slot, a cover member on said casing movable between open and closed positions and having a predetermined intermediate position adjacent said closed position, means requiring said cover member to be moved in quick snapping motion from its intermediate position into its said closed position, a row of pointed teeth on said cover member received by said slot when said cover is in its closed position, said teeth being of such length and being so constructed and arranged that the points thereon will perforate said tape when said cover member is moved in said snapping motion from its intermediate position into said closed position, and means including diagonally disposed cutting surfaces on the lateral edges of said teeth for severing said tape between the perforations therein during said snapping motion.

2. A tape dispenser comprising, a casing for enclosing a roll of tape, means within said casing for rotatably supporting said roll, said casing having a slot thereon and an opening through which said tape may be withdrawn in a path over said slot, a cover member on said casing movable between open and closed positions and having a predetermined intermediate position adjacent said closed position, stop means on said casing engaged by said cover member in its intermediate position, said stop means tending to obstruct normal movement of said cover member toward its said closed position and requiring said cover member to be moved past said stop means and into said closed position in snapping motion, a row of pointed teeth on said cover member received by said slot when said cover is in its closed position, said teeth being of such length and being so constructed and arranged that the points thereon will perforate said tape when said cover member is moved in said snapping motion from its intermediate position into said closed position, and means including diagonally dsposed cutting surfaces on the lateral edges of said teeth for severing said tape between the perforations therein during said snapping motion.

3. A tape dispenser comprising, a casing for enclosing a roll of tape, means within said casing for rotatably supporting said roll, said casing having a slot thereon and an opening through which said tape may be withdrawn in a path over said slot, a cover member on said casing movable between open and closed positions and having a predetermined intermediate position adjacent said closed position, said cover member being adapted in its closed position completely to cover said opening and said slot, means requiring said cover member to be moved in quick snapping motion from its intermediate position into its said closed position, a row of pointed teeth on the under side of said cover member received by said slot when said cover is in its closed position, said teeth being of such length and being so constructed and arranged that the points thereon will perforate said tape when said cover member is moved in said snapping motion from its intermediate position into said closed position, and means including diagonally disposed cutting surfaces on the lateral edges of said teeth for severing said tape between the perforations therein during said snapping motion.

4. A tape dispenser comprising, a casing for enclosing a roll of tape, means within said casing for rotatably supporting said roll, said casing having a slot thereon and an opening through which said tape may be withdrawn in a path over said slot, a cover member on said casing movable between open and closed positions and having a predetermined intermediate position adjacent said closed position, means requiring said cover member to be moved in quick snapping motion from its intermediate position into its said closed position, a row of pointed teeth on said cover member received by said slot when said cover is in its closed position, said teeth being of such length and being so constructed and arranged that the points thereon will perforate said tape when said cover member is moved in said snapping motion from its intermediate position into said closed position, and means on said teeth for severing said tape laterally in opposite directions from each of the perforations therein toward the next adjacent perforations during the snapping motion.

5. A tape dispenser comprising, a casing for enclosing a roll of tape, means wtihin said casing for rotatably supporting said roll, said casing having a slot thereon and an opening through which said tape may be withdrawn in a path over said slot, a cover member on said casing movable between open and closed positions and having a predetermined intermediate position adjacent said closed position, means requiring said cover member to be moved in quick snapping motion from its intermediate position into its said closed position, a row of pointed teeth on the underside of said cover member received by said slot when said cover is in its closed position, said teeth being of such length and being so constructed and arranged that the points thereon will perforate said tape when said cover member is moved in said snapping motion from its intermediate position into said closed position, and means on said teeth for laterally severing the portions of said tape between the perforations therein during said snapping motion.

6. A tape dispenser comprising, a casing for enclosing a roll of tape, means within said casing for rotatably supporting said roll, a cover member on said casing movable between open and closed positions and having a predetermined intermediate position adjacent said closed position, said casing having an opening therein through which a length of tape may be withdrawn from said roll along a path under said cover member when said cover member is in said open position, means requiring said cover member to be moved in snapping motion from its said intermediate position into said closed position, means on said cover member for perforating said length of tape simultaneously at a plurality of points along a line transverse thereto during said snapping movement of said cover member from its intermediate position into said closed position, and means on said cover member for laterally severing the portions of said tape between the perforations therein during said snapping motion.

7. A tape dispenser comprising, a casing for enclosing a roll of tape, means within said casing for rotatably supporting said roll, a cover member on said casing movable between open and closed positions and having a predetermined intermediate position adjacent said closed position, said casing having an opening therein through which a length of tape may be withdrawn from said roll along a path under said cover member when said cover member is in said open position, means requiring said cover member to be moved in snapping motion from its said intermediate position into said closed position, means on said cover member for perforating said length of tape simultaneously at a plurality of points along a line transverse thereto during said snapping movement of said cover member from its intermediate position into said closed position, and means on said cover for severing said tape laterally in opposite directions from each of the perforations therein toward the next adjacent perforations during said snapping motion.

8. A tape dispenser comprising, a pair of jaws relatively movable between open and closed positions and having a predetermined relative intermediate position adjacent said closed position, a first one of said jaws having a slot thereon, means for supporting a roll of tape in position wherein a length of tape may be withdrawn from said roll in a path between said jaws and over said slot, means requiring said jaws to be moved in quick snapping motion from said intermediate position to said closed position, a row of pointed teeth on the second of said jaws adapted to be received by said slot when said jaws are in closed position, said teeth being of such length that the points thereon will perforate said tape when said jaws are moved in said snapping motion from said intermediate position into said closed position, and cutting surfaces on the lateral edges of said teeth for severing said tape between the perforations therein during said snapping motion.

9. A dispenser for pressure-sensitive adhesive tape comprising, a casing for enclosing a roll of said tape, first and second upstanding spaced apart surfaces on said casing, an upstanding block on said casing disposed between said upstanding surfaces and adjacent said second surface thereby providing a slot between said block and said second surface, said first surface and said block having an unobstructed space therebetween, a cover member on said casing movable between open position and a closed position covering said first surface and said block and said space therebetween, means in said casing for rotatably supporting said roll of tape in position wherein a length of tape may be manually withdrawn under tension from said roll in a bridging path across said space and then over said slot when said cover is in said open position, and tape severing means on said cover moved into cutting contact with said tape and received by said slot when said cover is moved into said closed position, said first upstanding surface and said block providing surfaces to which a portion of said length of tape remaining attached to said roll will detachably adhere and thereby be maintained in said bridging path across said space in position readily to be grasped by the fingers when said cover member is again moved to open position preparatory to withdrawal of another length of tape.

10. A dispenser for pressure-sensitive tape comprising, a casing for enclosing a roll of said tape, first and second upstanding surfaces on said casing, an upstanding block on said casing located intermediate said surfaces, said block providing a slot disposed between said surfaces, a cover member on said casing movable between open position and a closed position, means in said casing for rotatably supporting said roll of tape in position wherein a length of tape, when said cover is in said open position, may be withdrawn under tension from said roll in a path first across said first upstanding surface then across said block and said slot and then across said second surface, and tape severing means on said cover moved into cutting contact with said tape and received by said slot when said cover is moved into said closed position, said first upstanding surface and said block providing surfaces to which a portion of said length of tape still attached to said roll will detachably adhere and thereby be maintained in readily accessible position to be grasped by the fingers when said cover member is again moved to open position, said cover member covering said portion of said length of tape when said cover is in said closed position.

11. A dispenser for pressure-sensitive adhesive tape comprising, a casing for enclosing a roll of said tape, first and second upstanding spaced apart surfaces on said casing, an upstanding block on said casing disposed between said upstanding surfaces and adjacent said second surface thereby providing a slot between said block and said second surface, said first surface and said block having an unobstructed space therebetween, a cover member on said casing movable between open position and a closed position covering said first surface and said block and said space therebetween, a depending flange on said cover member cooperating with an end of said block for requiring said cover member to be moved into said closed position in a quick snapping motion, means in said casing for rotatably supporting said roll of tape in position wherein a length of tape may be manually withdrawn under tension from said roll in a bridging path across said space and then over said slot when said cover is in said open position, and tape severing means on said cover moved into cutting contact with said tape and received by said slot when said cover is moved into said closed position, said first upstanding surface and said block providing surfaces to which a portion of said length of tape remaining attached to said roll will detachably adhere and thereby be maintained in said bridging path across said space in position readily to be grasped by the fingers when said cover member is again moved to open position preparatory to withdrawal of another length of tape.

12. A dispenser for pressure-sensitive adhesive tape comprising, a casing for enclosing a roll of said tape, first and second upstanding spaced apart surfaces on said casing, an upstanding block on said casing disposed between said upstanding surfaces and adjacent said second surface thereby providing a slot between said block and said second surface, said first surface and said block having an unobstructed space therebetween, a cover member on said casing movable between open position and a closed position covering said surfaces and said block, cooperating means on said cover and said casing for requiring said cover to be moved into said closed position in a quick snapping motion, means in said casing for rotatably supporting said roll of tape in position wherein a length of tape may be withdrawn under tension from said roll in a bridging path across said space and then over said slot when said cover is in said open position, a row of pointed teeth on said cover member received by said slot when said cover member is in its closed position, said teeth being of such length and being so constructed and arranged that the points thereon will perforate said tape over said slot when said cover member is moved in said snapping motion into said closed position, and diagonally disposed cutting surfaces on the lateral edges of said teeth for severing said tape between the perforations therein during said snapping motion, said first upstanding surface and said block providing surfaces to which a portion of said length of tape will detachably adhere and thereby be maintained in said bridging path across said space in position to be grasped by the fingers when said cover member is again moved to open position.

13. A readily portable, manually operated dispenser for pressure-sensitive adhesive tape comprising, a casing including a pair of spaced apart side walls, means for rotatably supporting a roll of said tape within said casing between said walls, an upstanding surface on said casing spaced radially outwardly with respect to the periphery of said roll, an upstanding block on said casing disposed closely adjacent said surface but spaced therefrom so as to provide a relatively narrow slot therebetween, said upstanding block being spaced from the periphery of said roll, and said upstanding surface and said block being so constructed and arranged that a length of tape may be manually withdrawn from the periphery of said roll in a bridging path extending over said block and said slot and thence over said surface, a cover on said casing movable between an open position permitting withdrawal of said tape along said path and a closed position covering said block and that portion of said withdrawn length of tape extending from said roll to said block, and tape cutting blade means on said cover moved into severing contact with said tape and received by said slot when said cover is moved into said closed position, said blade means having a thickness only slightly less than the space between said upstanding surface and said block so that said blade means passes closely adjacent both said surface and said block when said blade means is received in said slot therebetween, said upstanding block providing a surface to which the forward end extremity of a portion of unsevered tape remaining attached to said roll will detachably adhere and will thereby be maintained in said path in position readily to be grasped by the fingers when said cover is again moved to open position preparatory to the withdrawal of another length of tape.

14. A readily portable, manually operated dispenser for pressure-sensitive adhesive tape comprising, a casing including a pair of upstanding substantially parallel side walls, means for supporting a roll of said tape within said casing for rotation about an axis substantially normal to the planes of said walls, an upstanding surface on said casing spaced radially outwardly with respect to the periphery of said roll and extending transversely between the planes of said walls, an upstanding block on said casing disposed closely adjacent said surface but spaced therefrom so as to provide a relatively narrow slot therebetween, said upstanding block being spaced from the periphery of said roll, and said upstanding surface and said block being so constructed and arranged that a length of tape may be manually withdrawn from the periphery of said roll in a bridging path extending over said block and said slot and thence over said surface, a cover on said casing movable between an open position permitting withdrawal of said tape along said path and a closed position covering said block and that portion of said withdrawn length of tape extending from said roll to said block, and tape cutting blade means on said cover moved into severing contact with said tape and received by said slot when said cover is moved into said closed position, said blade means having a thickness only slightly less than the space between said upstanding surface and said block so that said blade means passes closely adjacent both said surface and said block when said blade means is received in said slot therebetween, said upstanding block providing a surface to which the forward end extremity of a portion of unsevered tape remaining attached to said roll will detachably adhere and will thereby be maintained in said path in position readily to be grasped by the fingers when said cover is again moved to open position preparatory to the withdrawal of another length of tape.

15. The combination set forth in claim 14, wherein the edges of said side walls adjacent said unsevered portion of said tape are provided with recesses that give ready access to the opposite lateral edges of said unsevered portion of said tape when said cover is opened.

16. The combination set forth in claim 14, wherein said bridging path of said tape extends directly from the periphery of said roll to said block and thence across said slot and said upstanding surface.

17. A readily portable, manually operated dispenser for pressure-sensitive adhesive tape comprising, a casing including a pair of upstanding substantially parallel side walls, means for supporting a roll of said tape within said casing for rotating about an axis substantially normal to the planes of said walls, an upstanding surface on said casing spaced radially outwardly with respect to the periphery of said roll and extending transversely between the planes of said walls, an upstanding block on said casing disposed closely adjacent said surface but spaced therefrom so as to provide a relatively narrow slot therebetween, said upstanding block being spaced from the periphery of said roll, and said upstanding surface and said block being so constructed and arranged that a length of tape may be manually withdrawn from the periphery of said roll in a bridging path extending over said block and said slot and thence over said surface, a cover on said casing movable between an open position permitting withdrawal of said tape along said path and a closed position covering said block and that portion of said withdrawn length of tape extending from said roll to said block, tape cutting means on said cover moved into severing contact with said tape and received by said slot when said cover is moved into said closed position, said upstanding block providing a surface to which a portion of unsevered tape remaining attached to said roll will detachably adhere and will thereby be maintained in said path in position readily to be grasped by the fingers when said cover is again moved to open position preparatory to the withdrawal of another length of tape, the edges of said side walls adjacent said unsevered portion of said tape being provided with recesses that give ready access to the opposite lateral edges of said unsevered portion of said tape when said cover is opened, and downwardly extending flanges on opposite edges of said cover so constructed and arranged as to protect said tape cutting means when said cover is in its open position and to occupy said recesses and enclose the lateral sides of said block and said unsevered portion of said tape when said cover is in its closed position.

References Cited in the file of this patent

UNITED STATES PATENTS

| | | |
|---|---|---|
| 2,750,029 | Morgan | June 12, 1956 |
| 2,776,095 | Emmert | Jan. 1, 1957 |